April 20, 1954   J. RAIBLE ET AL   2,675,587
DEVICE FOR SUPPORTING AND WEIGHTING THE
TOP ROLLS OF DRAWING MECHANISMS
Filed Aug. 30, 1950   5 Sheets-Sheet 5
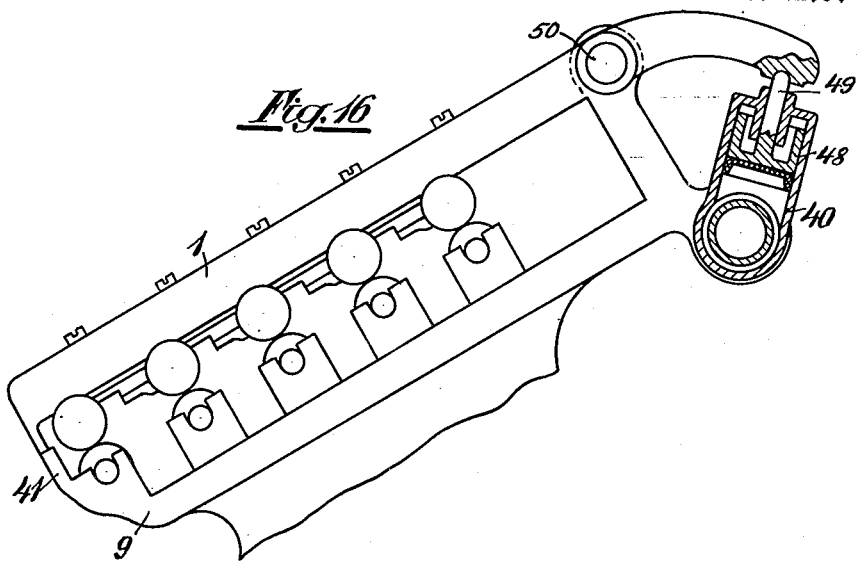
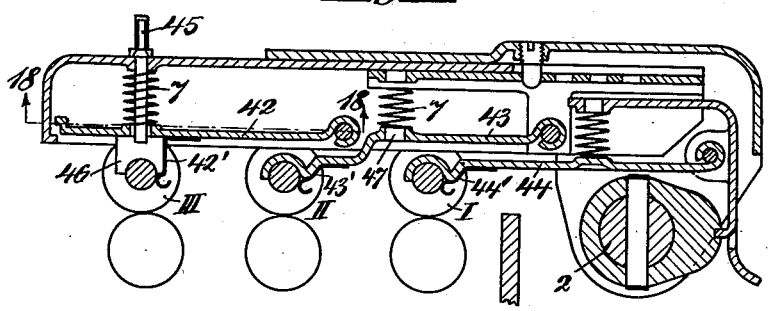
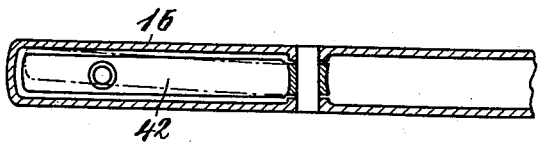
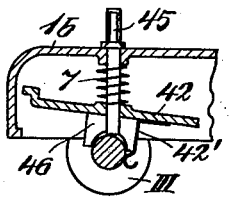
INVENTORS
JULIUS RAIBLE
AND ERWIN DAUSCH
BY

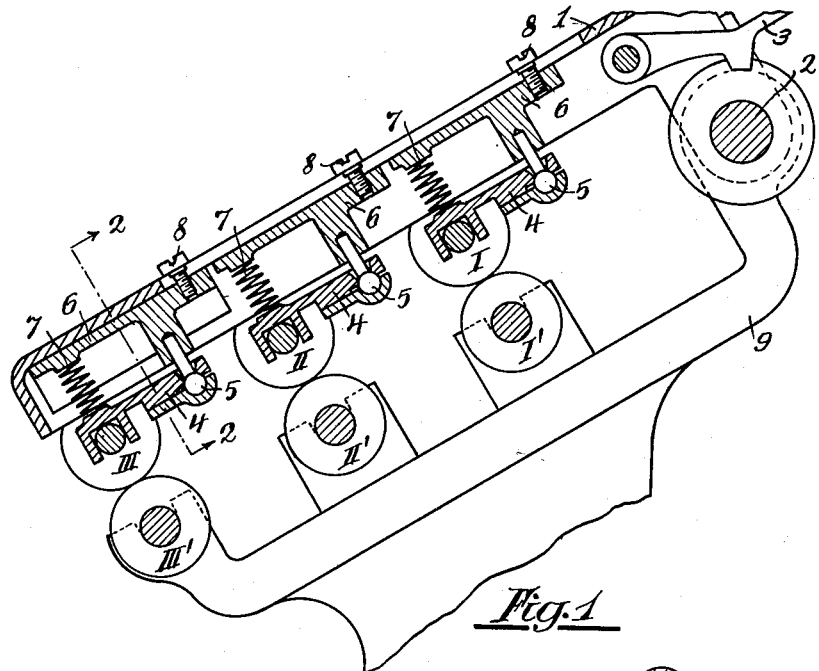
Fig.1
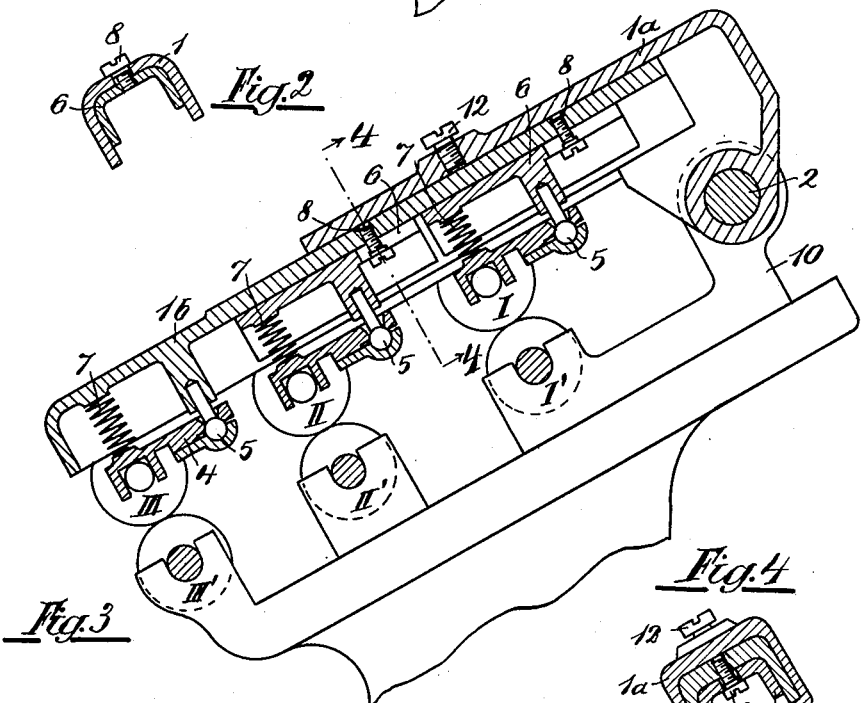
Fig.2  Fig.3  Fig.4
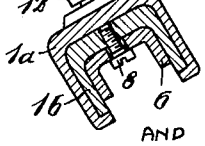
INVENTORS:
JULIUS RAIBLE
AND ERWIN DAUSCH
BY:

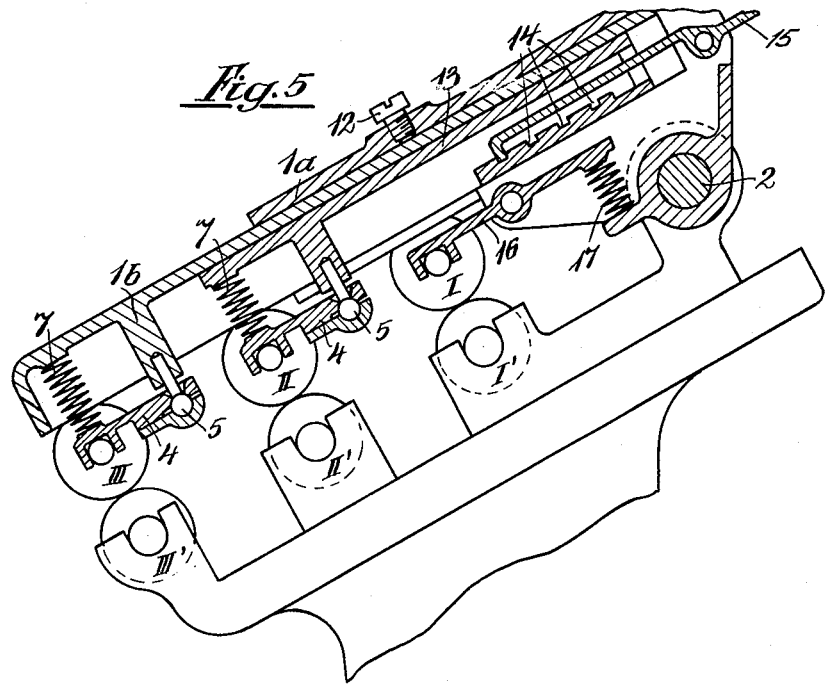
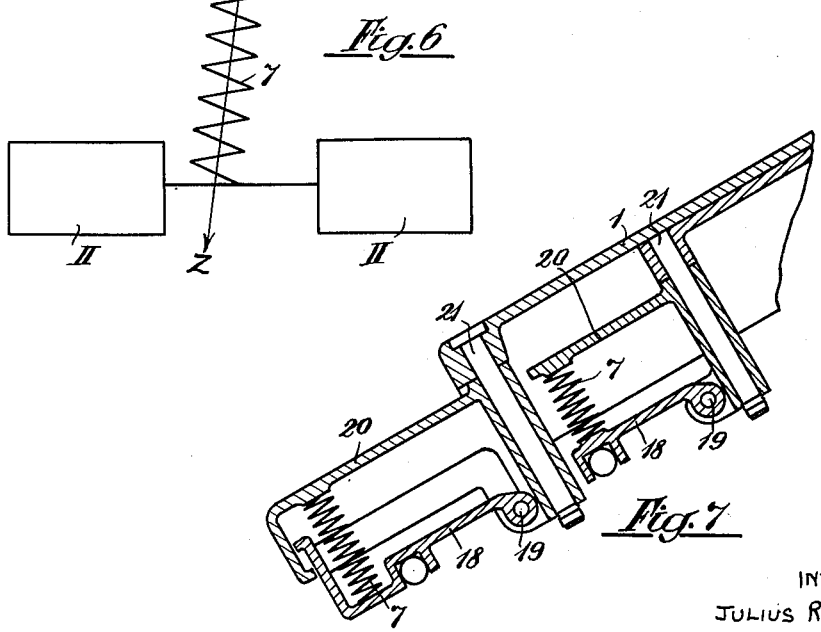

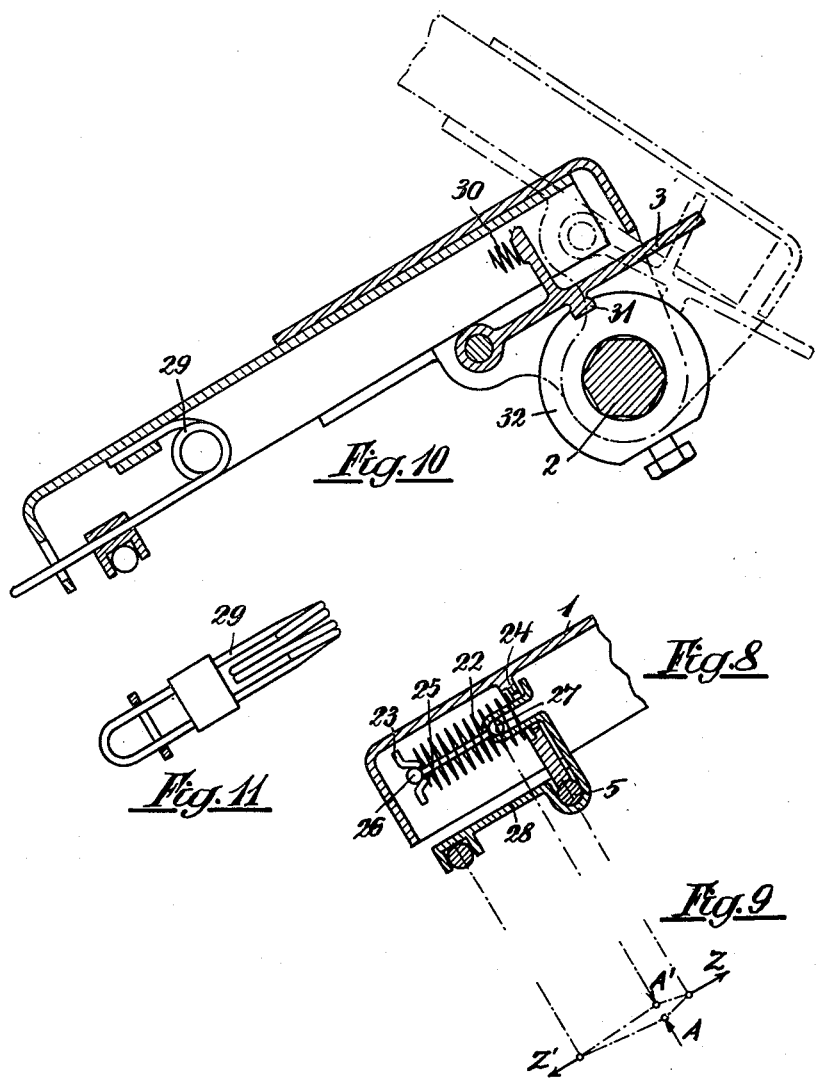

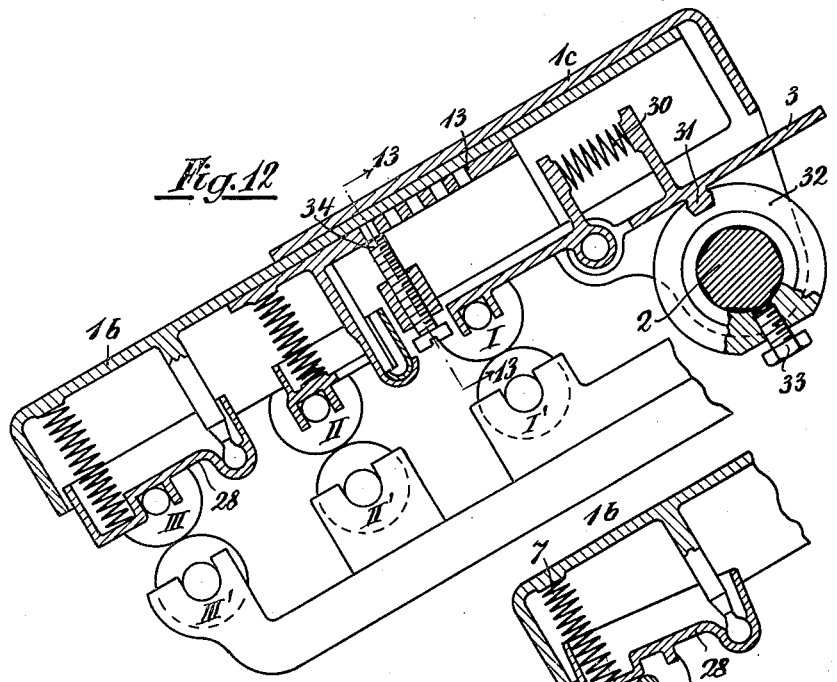
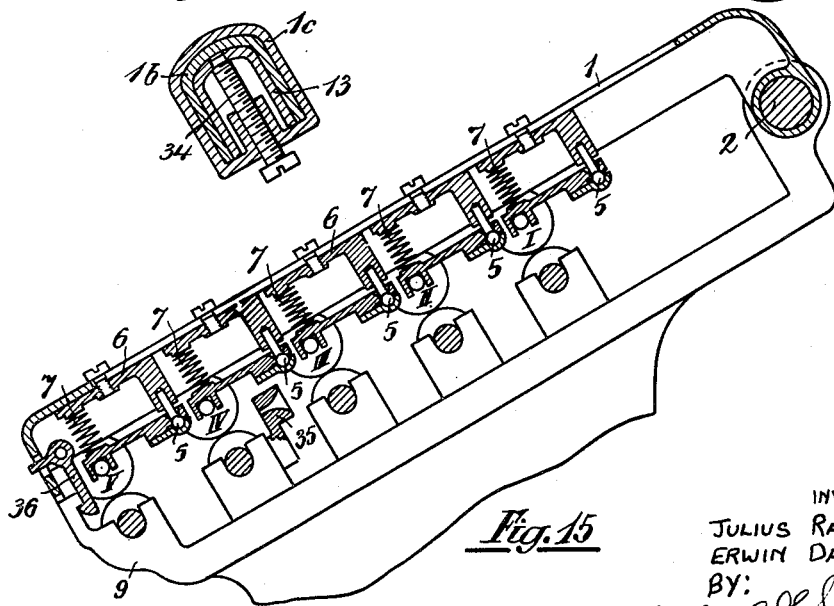

Patented Apr. 20, 1954

2,675,587

UNITED STATES PATENT OFFICE 2,675,587

DEVICE FOR SUPPORTING AND WEIGHTING THE TOP ROLLS OF DRAWING MECHANISMS

Julius Raible, Stuttgart-Frauenkopf, and Erwin Dausch, Esslingen (Wurttemberg), Germany, assignors to Vereinigte Kugellagerfabriken Aktiengesellschaft, Schweinfurt, Germany Application August 30, 1950, Serial No. 182,272

Claims priority, application Sweden September 23, 1949

16 Claims. (Cl. 19—135)

Our present invention relates to a device to be connected to the top rolls in drawing mechanism of textile machinery for supporting and weighting the said top rolls.

One of the objects of our invention is to provide a supporting and weighting means for the top rolls which eliminates all lateral elements guiding the top rolls and consists in a straight lay-out of the drawing mechanism which is easy to attend to and which is connected to the top rolls at the centers of the top rolls and above the top rolls.

In the usual type of device connected to the rolls of drawing mechanisms of textile machinery the load required to produce the adequate force to grip the textiles is usually produced by extra weights and in some cases by a spring force or by pneumatic or hydraulic pressure. Such systems of loading usually apply the force from one point of the guiding arm and the force is distributed therefrom by a system of lever action bridges, saddles, etc., to the individual top rolls or groups of top rolls. In such arrangements trouble is encountered in obtaining the required pattern of forces because of the fact that modifications in the relative spacing of the rolls is very often required to process different types of textiles, so that a number of disadvantages results whenever the layout of the rolls is changed.

Two cases will be considered here:

(a) The shifting of the effective loading point in conjunction with the shifting of the transfer points of the load which occurs when the spacing between the rolls is adjusted, and (b) Providing at the entrance to the drawing apparatus so high a load that even with the most unfavorable pattern of spacings between the rolls there still is maintained adequate drawing power at the rolls.

Case (a) requires a tedious adjusting process whenever the set-up of the drawing mechanism is changed causing a great waste of time. This disadvantage cannot be fully remedied even by making one pair of rolls, as for example the entrance rolls inherently heavy enough so that its natural weight produces the required gripping force.

In case (b) there is, with three pairs of rolls which is the usual set-up, only one arrangement of rolls wherein the distribution of rolls is correct. It usually happens, however, that when the distribution is correct in this case, the gripping power of the rolls is incorrect because, as mentioned above, the load has to be forceful enough at the entrance so that adequate gripping power is provided no matter what different roll positions are encountered. There is thus a disadvantage with most settings of drawing mechanisms in that the gripping forces are excessive, which results in excess wear on the roll coating and supporting points, as well as requiring an increased use of power. In certain cases the drawing power of at least some rolls may be insufficient which results in erratic performance of the mechanism.

Our present invention eliminates these disadvantages by providing a supporting unit which extends over the entire drawing zone and which carries individual guiding and weighting arms associated with the top rolls.

A further object of our present invention is to provide individual guiding arms for guiding and loading at least one pair of top rolls in such a way that the guiding system is self-aligning and an alignment of the top rolls with their axes parallel to the axes of their associated bottom rolls is automatically obtained.

Another object of our invention is to provide a supporting unit which may or may not be adjustable in length.

A further object of our present invention is to provide auxiliary arms connected to the supporting unit and associated with individual top rolls, the said auxiliary arms being capable of individual adjustment.

A further object of our present invention is to provide a means for individually loading each of said auxiliary arms.

An additional object of our present invention is to provide a construction wherein the loading means shifts along with the unit which changes the position of the rolls so that the loading means remains uniform irrespective of the adjustment of the rolls.

With the above objects in view, our present invention relates to an apparatus for holding and weighting top rolls of textile drawing machines comprising, in combination, a plurality of sets of top rolls, each of the sets comprising a pair of spaced rolls rigidly connected by a shaft located between and centrally of the rolls, a plurality of arms and means for connecting each of the arms to each of the top rolls so that the rolls are free to rotate with respect to the arms, a supporting unit extending over all of the top rolls, and means connected to the arms and connected to the supporting unit for individually loading and pivotally mounting the arms, so that the arms bear against the top rolls and so that the top rolls may swing with the arms perpendicularly to the drawing plane.

More particularly our present invention relates to an apparatus for holding and weighting top rolls comprising in combination, a plurality of sets of top rolls, each of the sets comprising a pair of spaced rolls rigidly connected by a shaft located between and centrally of the rolls, a plurality of springs and means for connecting each of the springs to each of the top rolls so that the rolls are free to rotate with respect to the springs, said springs being directly connected to a supporting unit extending over all of the top rolls, whereby the springs serve as both guiding and loading arms for the top rolls.

The novel features which we consider as characteristic of our invention are set forth in particular in the appended claims. The invention itself however, both as to its construction and its method of operation together with additional objects and advantages will be best understood from the following description of specific embodiments when read in connection with the accompanying drawings in which:

Fig. 1 is a longitudinal cross-section of a holding arm extending over the plane of the drawing frame;

Fig. 2 is a cross-sectional view taken on line 2—2 of Fig. 1, looking in the direction of the arrows;

Fig. 3 is a view of a different embodiment of a holding arm;

Fig. 4 is a cross-sectional view taken along the line 4—4 of Fig. 3 and looking in the direction of the arrows;

Fig. 5 is a longitudinal cross-sectional view of a third embodiment of the invention;

Fig. 6 is a schematic diagram showing the manner in which forces may be distributed with the constructions of Figs. 1 through 5;

Fig. 7 is a longitudinal cross-sectional view of an additional embodiment where the defect shown diagrammatically in Fig. 6 has been eliminated;

Fig. 8 is an additional embodiment of the invention which serves the same purpose as the embodiment shown in Fig. 7, namely, the elimination of the defect shown diagrammatically in Fig. 6;

Fig. 9 is a force diagram associated with Fig. 8;

Figs. 10 and 11 show a longitudinal cross-sectional view and a partial top view, respectively, of a further embodiment of the invention wherein a loading spring simultaneously serves as a weighting arm and as a means for connecting the supporting unit to the top rolls;

Fig. 12 is a longitudinal cross-sectional view of a sectionalized holder wherein one of the loading springs serves an additional purpose;

Fig. 13 is a cross-sectional view taken on the line 13—13 of Fig. 12 and looking in the direction of the arrows;

Fig. 14 shows the front end of the supporting unit in a position which permits the removal of the associated top roll;

Fig. 15 is a longitudinal cross-sectional view of a supporting unit which houses more than three pairs of top rolls;

Fig. 16 is a longitudinal cross-sectional view of an embodiment wherein a simple special device is used for disengaging the drawing mechanism;

Fig. 17 presents a longitudinal cross-sectional view of a further embodiment of the invention comprising a particularly simple design of a supporting unit having only three pairs of top rolls;

Fig. 18 is a cross-sectional view taken along the line 18—18 of Fig. 17, looking in the direction of the arrows; and Fig. 19 is a view of the left portion of Fig. 17 in a different position.

Considering the embodiment of the invention shown in Figs. 1 and 2, the supporting assembly 1 extends over the entire length of the drawing zone and is of U-shaped cross-section. In the operating position shown, the supporting assembly is latched by pawl 3 to bar 2 which passes horizontally in the plane of the drawing zone. A set of guiding arms 4, each associated with a pair of top rolls I, II and III is so attached to the supporting assembly 1 that each of said arms forces the top rolls to assume a position in alignment with the plane of the drawing zone and also permits the said arms and the top rolls associated therewith to pivot about ball-joints 5 which are mounted on slide 6. These slides 6 can in turn be displaced in a direction parallel to the plane of the body zone along supporting unit 1. Bolts 8 hold slides 6 in their adjusted position, and upon loosening the bolts 8 the slides 6 may have their positions changed, and in this way also change the position of the associated top rolls connected therewith. Each of the guiding arms 4 is loaded by a spring 7 which bears against the slide 6 so that the gripping force between the top rolls and the bottom rolls associated therewith, that is, between rolls I—I', II—II', III—III', remains entirely unaffected whenever the position of the top rolls is adjusted in the manner described above. Such adjustment is usually necessary to adapt the rolls to the various lengths of textiles processed. Before adjusting the top rolls the supporting assembly 1 can be released from bar 2 and lifted up by disengaging pawl 3 from its position in a notch of bar 2. As is clearly shown in Fig. 1, pawl 3 is pivotally mounted so as to swing in a plane perpendicular to the drawing plane and has an extension which permits the operator to release pawl 3 from bar 2 and thereby free supporting unit 1.

In some cases it is advantageous not to fix bar 2 to the underframe 9 of the drawing mechanism, as shown in Fig. 1. It is sometimes more advantageous to fix bar 2 to rear slide 10, shown in Fig. 3, said rear slide supporting the bottom of entrance roll I'. Such a construction requires a supporting unit which is adjustable in length. As shown in Fig. 3 such a unit is made up of two sections, the guiding unit 1a and the unit 1b slidably connected to section 1a. The front roll III, the so-called supply roll, is adjusted by displacing sliding front section 1b relative to guiding section 1a. A screw 12 passes through section 1a and bears against section 1b to hold it in operating position.

It has been found from experience that the spacing between roll pairs I—I' and II—II', which comprise the so-called pre-zone of the drawing mechanism, need not be accurately adjusted. They may be adjusted coarsely as distinguished from the spacings between the roll pairs II—II' and III—III'. This fact is allowed for in the construction shown in Fig. 5 wherein slide 13, carrying the arm loading top roll II, comprises detent grooves 14 in which the pivotally mounted pawl 15 is engaged. There is thus produced a considerably simplified means for adjusting the drawing mechanism. In Fig. 5 the arm 16 which guides top roll I is not associated with a ball joint but is pivotally mounted so that it may swing only in a plane perpendicular to the drawing plane. The said arm 16 is loaded by a spring 17. This construction is advantageous in cases where the pair of rolls I—I' moves only slowly, since in such a case self-alignment of the rolls to their central position also takes place slowly. The gripping force between the rolls shown in Fig. 5 is produced by construction similar to that shown in the other figures.

With the loading spring 7 arranged as shown in any of the Figs. 1 to 5, it is possible that, due to defects in the construction of the spring, there is produced a lateral component Z, shown in Fig. 6, which opposes the automatic self-alignment of the top roll. This condition is taken care of by the construction shown in Fig. 7. In Fig. 7 the guiding arms 4 of Figs. 1 to 5 have been replaced by box-like units comprising two sections 18 and 20 with loading spring 7 arranged therebetween. The parts 18 which load the top rolls are freely mounted with respect to parts 20 to pivot only around the shafts 19 in a plane perpendicular to the drawing zone. Parts 20 on the other hand, are pivotally mounted about the studs 21 so that they are free to swing in a plane parallel to the plane of the drawing zone. The said studs 21 are fixed to the supporting unit 1. Joints 19 and 21 thus combine to provide a construction wherein the self-aligning feature cannot be impaired by defects in the construction of spring 7 since any lateral force produced by spring 7 remains without effect on the top rolls.

A similar result is achieved by the embodiment shown in Fig. 8, wherein the loading springs 22 bear against the cup 23 and the fixed support 24 within the supporting unit 1. The said loading springs 22 act through bars 25 and the associated ball joints 26 and 27 to pull on the loading arms 28, these loading arms being mounted so as to freely swing in all directions about the ball joints 5. With the arrangement shown in Fig. 8 where the transmission joint 27 is interposed between the ball joint 5 and joint 26, the spring 22 even if inaccurately made aids in the aligning of the top roll axis parallelly to the axis of the bottom roll, since any deviation in the force of spring 22 caused by defects therein sets up a power component in the direction A or A' as shown in Fig. 9.

In the embodiments shown in Figs. 10 and 11, the springs 29 simultaneously serve as loading arm, loading element and as a means for connecting the supporting unit to the top rolls. This spring may be constructed of a straight piece of steel strip or it may have the special shape shown in Fig. 11, wherein the spring wire which makes up the spring 29 is coiled in a manner which is obvious from the inspection of Figs. 10 and 11.

In the embodiments shown in Figs. 12 and 13, there is a sectionalized supporting unit made up of a rear section 1c, a front section 1b, and a slide 13. The particular feature of this construction is the fact that spring 30 which loads the entrance roll I, simultaneously holds pivotally mounted pawl 3' in position. Pawl 3 comprises the extension 31 which engages a recess in the ring 32 which is fixedly mounted on bar 2 by means of screw 33 thereby holding all of the supporting assembly down to the bar 2. (This construction is also shown in Fig. 10.) By loosening the screw 34 which, as is obvious from the construction of Fig. 12, holds the slide 13 in place, the position of the said slide may be changed by engaging a different one of the recesses shown in element 13 in Fig. 12 with the screw 34.

Fig. 14 shows the front end of the section 1b of Fig. 12 in a position where the guiding arm 28 enables the removal of roll III without swinging up the entire supporting section 1b. This is a particularly important feature since the textile material is likely to ravel up on coil III, in which case the said material must be quickly removed from roll III, as it would be extremely inconvenient if the entire supporting unit had to be tilted each time the material which had ravelled on roll III had to be removed.

The embodiment shown in Fig. 15 shows how readily the supporting unit 1 may be adapted to carry any number of loading arms and top rolls. Since each top roll is individually loaded the loading pattern is statically well-defined. Even upon adjustment of the spacing between the rolls no alteration is required in the associated roll loads. The embodiment of Fig. 15 additionally shows that by eliminating loading hooks, pulling rods and similar devices which have been required in conventional constructions, it is fairly simple to accommodate such elements as are convenient or required for the drafting operation. Thus, in Fig. 15 there is shown element 35 which represents a so-called consolidating organ. With equal facility means can be provided for producing a false thread in the drafting operation, such as for example, the so-called twisting tubes. With the supporting unit 1 extending as far as shown in Fig. 15, it may be advisable to fix the supporting unit to the underframe 9 of the drawing mechanism by means of pawl 36. The arrangement in accordance with the invention thus meets to a large degree the present-day efforts for maximum drafting ratios which require a large number of rolls.

In the embodiment shown in Fig. 16, there is included a device which enables a drawing mechanism to be relieved in a particularly simple manner. This result is obtained by a fluid pressure means such as a hydraulic or pneumatic holding mechanism 40 comprising piston 48 and extension 49 thereon which engages a recess in supporting unit 1 which is pivotally mounted at 50. The fluid pressure means 40 engages the rear end of support 1 and by pivoting the support 1 about the pivot 50 pushes on the support until it comes to rest against the stop 41 on frame 9. In this position of the support the individual loads on the top rolls, which are not shown in Fig. 16, go into effect. To disengage the drawing mechanism all that is required is to relieve the pressure of fluid pressure means 40 thereby permitting the piston 48 and extension 49 to move away from the recess at the end of supporting unit 1, thereby permitting the supporting unit to be swung perpendicularly to the drawing plane about the pivot 50. The fluid pressure in the fluid pressure means 40 may be controlled from any remote position and may be applied thereto by any known construction.

In Fig. 17 there is disclosed a particularly inexpensive and convenient embodiment for a conventional three-roll-pair drawing mechanism. The individual sections of the supporting unit are pressed from sheet metal and they can be displaced from each other in a manner which is obvious from the construction illustrated in Fig. 17. The arms 42, 43, 44 guiding the top rolls are made as long as possible and they partly overlap. The several springs 7 loading the top rolls can be made uniform in this construction since there is now space enough to accommodate two springs 7 for load roll III if such is required in order to produce heavier loading.

The guiding arms 42, 43, and 44 are shaped like flaps as shown in Figs. 17, 18 and 19 and are so arranged that they cover up the open bottom of the supporting unit, thereby to a large extent preventing dirt and other foreign matter from entering the inside of the supporting unit. Within the U-shaped supporting unit of Fig. 17, the arms 42, 43, and 44 are given a limited degree of lateral clearance which produces the advantage that the associated top roll cannot move laterally to an undesired degree when the ravelled materials are being removed from the top roll by the operator.

By a stop provided on the supporting unit which in the embodiment shown in Figs. 17 and 19 is indicated by stud 45, the top roll is pushed from the saddle 46 of the guiding arm 42 when the guiding arm is moved upwardly against the spring 7. Arms 42, 43, and 44 respectively have leaf springs 42', 43', and 44' connected thereto and engaging the top rolls. (As in the previous embodiments and as is clear from Fig. 17, the guiding arms 42, 43, and 44 are pivotally mounted so that they are free to swing in a plane perpendicular to the drawing plane.) The provision of a stud 45 as shown in Figs. 17 and 19 is particularly advantageous when associated with front top roll III which frequently requires the removal of ravelled materials.

On guide arm 43 is shown an opening 47, in Fig. 17, through which compressed air may be blown inside of the support in order to remove any foreign matter which may have accumulated therein during the operation of the machine.

It will be understood that each of the elements described above, or two or more together may also find useful application in various types of drawing mechanisms for textile materials other than the types disclosed herein.

While we have illustrated and described the invention as embodied in a device for supporting and weighting the top rolls of drawing mechanisms, we do not intend to be limited to the details, shown since various modifications and structural changes may be made without departing from the spirit of our invention.

Without further analysis the foregoing will so fully reveal the gist of our invention that others can, by applying current knowledge, readily adapt it for various applications without omitting features that, from the standpoint of the prior art, fairly constitute the essential characteristics of the generic or specific aspects of this invention, and, therefore, such adaptations should and are intended to be comprehended within the meanings and range of equivalents of the following claims.

What we claim as new and desire to secure by Letters Patent is:

1. Apparatus for holding and weighting top rolls of textile drawing machines comprising in combination, a plurality of sets of top rolls; a plurality of arms and holding means on each of said arms respectively engaging each of said sets of top rolls to hold said rolls freely rotatable with respect to said arms; a supporting unit extending in direction over said top rolls; and a plurality of mounting means respectively connected to said arms and being connected to said supporting unit for individually loading and pivotally mounting said arms, so that said arms bear against said top rolls and so that said arms may swing with said top rolls toward and away from the drawing plane, at least two mounting means for said top rolls being adjustably connected to said supporting unit, whereby the location of said latter top rolls may be changed by adjusting said adjustably connected mounting means and whereby the loading on said top rolls is the same after said adjustment as it was before said adjustment.

2. Apparatus for holding and weighting top rolls for textile drawing machines comprising in combination, a plurality of top rolls; a plurality of arms and holding means on each of said arms respectively engaging each of said top rolls to hold said rolls freely rotatable with respect to said arms; a supporting unit extending in direction over said top rolls; and individual units respectively connected to said arms and being slidably connected to said supporting unit so as to be movable in a direction parallel to the drawing plane, said individual units comprising means for individually loading and pivotally mounting said arms, so that said arms bear against said top rolls and so that said arms may swing with said top rolls toward and away from the drawing plane, at least two mounting means for said top rolls being adjustably connected to said supporting unit, whereby the location of said latter top rolls may be changed by adjusting said units and whereby the loading on said top rolls is the same after said adjustment as it was before said adjustment.

3. Apparatus for holding and weighting top rolls of textile drawing machines comprising in combination, a plurality of top rolls; a plurality of arms and holding means on each of said arms respectively engaging each of said top rolls to hold said rolls freely rotatable with respect to said arms; a supporting unit extending in direction over said top rolls; and a plurality of mounting means respectively connected to said arms and being connected to said supporting unit for individually loading and pivotally mounting said arms, so that the axes of said top rolls are parallel to the axes of the bottom rolls associated therewith and so that said arms bear against said top rolls, said arms being swingable with said top rolls toward and away from the drawing plane, at least two mounting means for said top rolls being adjustably connected to said supporting unit, whereby the location of said latter top rolls may be changed by adjusting said adjustably connected mounting means and whereby the loading on said top rolls is the same after said adjustment as it was before said adjustment.

4. Apparatus for holding and weighting top rolls of textile drawing machines comprising in combination, a base; a plurality of top rolls; a plurality of arms and holding means on each of said arms respectively engaging each of said top rolls to hold said rolls freely rotatable with respect to said arms; a supporting unit extending in direction over said top rolls and being pivotally mounted adjacent one end thereof on said base so that said supporting unit may be swung in a plane toward and away from the plane of the drawing zone; and a plurality of mounting means respectively connected to said arms and being adjustably connected to said supporting unit for individually loading and pivotally mounting said arms, so that said arms bear against said top rolls and so that said arms may swing with said top rolls perpendicularly to the drawing plane, whereby the location of said top rolls may be changed by adjusting said adjustably connected mounting means and whereby the loading on said top rolls is the same after said adjustment as it was before said adjustment.

5. Apparatus for holding and weighting top rolls of textile drawing machines comprising in combination, a base; a plurality of top rolls; a plurality of arms and holding means on each of said arms respectively engaging each of said top rolls to hold said rolls freely rotatable with respect to said arms; a supporting unit extending in direction over said top rolls and pivotally mounted adjacent one end thereof on said base so that said supporting unit may be swung in a plane toward and away from the plane of the drawing zone; locking means located on said supporting unit and base for locking said supporting unit in an operating position; and a plurality of mounting means respectively connected to said arms and being adjustably connected to said supporting unit for individually loading and pivotally mounting said arms, so that said arms bear against said top rolls and so that said arms may swing with said top rolls perpendicularly to the drawing plane, whereby the location of said top rolls may be changed by adjusting said adjustably connected mounting means and whereby the loading on said top rolls is the same after said adjustment as it was before said adjustment.

6. Apparatus for holding and weighting top rolls of textile drawing machines comprising in combination, a plurality of top rolls; a supporting unit extending in direction over said top rolls; a plurality of arms connected to said supporting unit; and holding means on each of said arms respectively engaging each of said top rolls to hold said rolls freely rotatable with respect to said arms, said arms each comprising two sections between which a loading spring is mounted, one of said sections being pivotally mounted on said supporting unit to swing in a plane parallel to the drawing plane and the other of said sections being pivotally mounted on said supporting unit to swing in a plane toward and away from the drawing plane.

7. Apparatus for holding and weighting top rolls of textile drawing machines comprising in combination, a plurality of top rolls; a plurality of arms holding means on each of said arms respectively engaging each of said top rolls to hold said rolls freely rotatable with respect to said arms; a supporting unit extending in direction over said top rolls; and a plurality of mounting means respectively connected to said arms and being adjustably connected to said supporting unit for individually loading and pivotally mounting said arms, so that said arms bear against said top rolls and so that said arms may swing with said top rolls toward and away from the drawing plane, whereby the location of said top rolls may be changed by adjusting said adjustably connected mounting means and whereby the loading on said top rolls is the same after said adjustment as it was before said adjustment, said loading means comprising a spring which extends in a direction parallel to the drawing plane.

8. Apparatus for holding and weighting top rolls of textile drawing machines comprising in combination, a base; a plurality of top rolls; a plurality of arms and holding means on each of said arms respectively engaging each of said top rolls to hold said rolls freely rotatable with respect to said arms; a supporting unit extending in direction over said top rolls and being pivotally mounted adjacent one end thereof on said base so that said supporting unit may be swung in a plane perpendicular to the plane of the drawing zone; and mounting means connected to said arms and adjustably connected to said supporting unit for individually loading and pivotally mounting said arms, so that said arms bear against said top rolls and so that said arms may swing with said top rolls toward and away from the drawing plane, whereby the location of said top rolls may be changed by adjusting said adjustably connected mounting means and whereby the loading on said top rolls is the same after said adjustment as it was before said adjustment, said loading means comprising springs; and locking means located on said base and supporting unit for locking said supporting unit in an operating position, said locking means comprising one of said springs.

9. Apparatus for holding and weighting top rolls of textile drawing machines comprising in combination, a base; a plurality of top rolls; a plurality of arms and holding means on each of said arms respectively engaging each of said top rolls to hold said rolls freely rotatable with respect to said arms; a supporting unit extending in direction over said top rolls and pivotally mounted adjacent one end thereof on said base so that said supporting unit may be swung in a plane perpendicular to the plane of the drawing zone; fluid pressure means located between said base and supporting unit for locking said supporting unit in an operating position; and a plurality of mounting means respectively connected to said arms and being adjustably connected to said supporting unit for individually loading and pivotally mounting said arms, so that said arms bear against said top rolls and so that said arms may swing with said top rolls toward and away from the drawing plane, whereby the location of said top rolls may be changed by adjusting said adjustably connected mounting means and whereby the loading on said top rolls is the same after said adjustment as it was before said adjustment.

10. Apparatus for holding and weighting top rolls of textile drawing machines comprising in combination, a plurality of top rolls; a plurality of arms and holding means on each of said arms respectively engaging each of said top rolls to hold said rolls freely rotatable with respect to said arms; a supporting unit open at its underside and extending in direction over said top rolls, said open underside of said supporting unit being substantially covered by said arms; and a plurality of mounting means respectively connected to said arms and being adjustably connected to said supporting unit for individually loading and pivotally mounting said arms, so that said arms bear against said top rolls and so that said arms may swing with said top rolls toward and away from the drawing plane, whereby the location of said top rolls may be changed by adjusting said adjustably connected mounting means and whereby the loading on said top rolls is the same after said adjustment as it was before said adjustment.

11. Apparatus for holding and weighting top rolls of textile drawing machines comprising in combination, a plurality of top rolls; a plurality of arms and holding means on each of said arms respectively engaging each of said top rolls to hold said rolls freely rotatable with respect to said arms; a supporting unit extending in direction over said top rolls; a plurality of mounting means respectively connected to said arms and being adjustably connected to said supporting unit for individually loading and pivotally mounting said arms, so that said arms bear against said top rolls and so that said arms may swing with said top rolls toward and away from the drawing plane, whereby the location of said top rolls may be changed by adjusting said adjustably connected mounting means and whereby the loading on said top rolls is the same after said adjustment as it was before said adjustment; and a stud fixed to said supporting unit and extending through an opening in one of said arms, whereby, when said arm is swung about its pivot, the top roll associated therewith contacts said stud and is separated from said arm.

12. Apparatus for holding and weighting top rolls of textile drawing machines comprising in combination, a plurality of top rolls; a plurality of arms and holding means on each of said arms respectively engaging each of said top rolls to hold said rolls freely rotatable with respect to said arms; a supporting unit open at its underside and extending in direction over said top rolls, said open underside of said supporting unit being substantially covered by said arms; a plurality of mounting means respectively connected to said arms and being adjustably connected to said supporting unit for individually loading and pivotally mounting said arms, so that said arms bear against said top rolls and so that said arms may swing with said top rolls toward and away from the drawing plane, whereby the location of said top rolls may be changed by adjusting said adjustably connected mounting means and whereby the loading on said top rolls is the same after said adjustment as it was before said adjustment; and an opening extending through one of said arms to permit the interior of said supporting unit to be blown out.

13. Apparatus for holding and weighting top rolls of textile drawing machines comprising in combination, a plurality of top rolls; a plurality of arms and holding means on each of said arms respectively engaging each of said top rolls to hold said rolls freely rotatable with respect to said arms; a supporting unit extending in direction over said top rolls; and a plurality of mounting means respectively connected to said arms and being connected to said supporting unit for individually loading and pivotally mounting said arms, so that said arms bear against said top rolls and so that said arms may swing with said top rolls toward and away from the drawing plane.

14. Apparatus for holding and weighting top rolls of textile drawing machines comprising in combination, a plurality of top rolls; a plurality of arms and holding means on each of said arms respectively engaging each of said top rolls to hold said rolls freely rotatable with respect to said arms; a supporting unit extending in direction over said top rolls and comprising a plurality of slidably connected sections, whereby the length of said supporting unit may be adjusted; and mounting means connected to said arms and being adjustably connected to said supporting unit for individually loading and pivotally mounting said arms, so that said arms bear against said top rolls and so that said arms may swing with said top rolls toward and away from the drawing plane, whereby the location of said top rolls may be changed by adjusting said adjustably connected mounting means and whereby the loading on said top rolls is the same after said adjustment as it was before said adjustment.

15. An apparatus as defined in claim 13 and wherein said holding means on each arm is in the form of a leaf spring fixed to said arm and engaging the shaft of the set of top rolls associated with said arm.

16. An apparatus as defined in claim 13 and wherein said mounting means connected to each arm includes a coil spring extending in a direction substantially normal to the drawing plane and having a lower end portion engaging said arm.

References Cited in the file of this patent

UNITED STATES PATENTS

| Number | Name | Date |
|---|---|---|
| 2,246,474 | Stahlecker | June 17, 1941 |
| 2,326,979 | Stahlecker | Aug. 17, 1943 |
| 2,353,338 | Hess | July 11, 1944 |
| 2,508,964 | Naegeli | May 23, 1950 |

FOREIGN PATENTS

| Number | Country | Date |
|---|---|---|
| 6,125 | Great Britain | of 1893 |
| 20,535 | Great Britain | of 1909 |